United States Patent
Ohashi et al.

(10) Patent No.: US 9,699,227 B2
(45) Date of Patent: Jul. 4, 2017

(54) INFORMATION PROCESSING SYSTEM, INFORMATION PROCESSING APPARATUS, AND SERVER

(71) Applicant: Sony Computer Entertainment Inc., Tokyo (JP)

(72) Inventors: Yoshinori Ohashi, Tokyo (JP); Kiyoto Shibuya, Saitama (JP); Hiroyuki Kawahara, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 142 days.

(21) Appl. No.: 14/386,211

(22) PCT Filed: Apr. 1, 2013

(86) PCT No.: PCT/JP2013/002217
§ 371 (c)(1),
(2) Date: Sep. 18, 2014

(87) PCT Pub. No.: WO2013/150762
PCT Pub. Date: Oct. 10, 2013

(65) Prior Publication Data
US 2015/0046573 A1 Feb. 12, 2015

(30) Foreign Application Priority Data
Apr. 2, 2012 (JP) .................... 2012-084330

(51) Int. Cl.
*G06F 15/177* (2006.01)
*G06F 15/16* (2006.01)
(Continued)

(52) U.S. Cl.
CPC ...... *H04L 65/1073* (2013.01); *H04L 41/0806* (2013.01); *H04L 65/4084* (2013.01);
(Continued)

(58) Field of Classification Search
CPC .............. H04L 65/605; H04L 65/4076; H04L 65/4069; H04L 67/06; H04L 67/104;
(Continued)

(56) References Cited

U.S. PATENT DOCUMENTS

| 7,158,047 | B2 | 1/2007 | Ushida |
| 8,204,975 | B2 | 6/2012 | Yamada |

(Continued)

FOREIGN PATENT DOCUMENTS

| CN | 1627721 A | 6/2005 |
| CN | 1934844 A | 3/2007 |

(Continued)

OTHER PUBLICATIONS

Office Action for corresponding JP Application 2012-084330, pp. 1-7, dated Dec. 22, 2015.

(Continued)

*Primary Examiner* — Farzana Huq
(74) *Attorney, Agent, or Firm* — Matthew B. Dernier, Esq.

(57) ABSTRACT

In a media server, a registration processing block registers a client apparatus connectable to the media server and an information provision block provides information related with the registered client apparatus to an information processing apparatus. In the information processing apparatus, when an information acquisition block acquires information related with two or more client apparatuses, then a display processing block generates display data for displaying type identification information and device identification information for each client apparatus. The type identification information is a name of the client apparatus and the device identification information is a MAC address.

10 Claims, 8 Drawing Sheets

(51) Int. Cl.
  H04L 29/06      (2006.01)
  H04N 21/258     (2011.01)
  H04N 21/426     (2011.01)
  H04L 12/24      (2006.01)
  H04N 21/431     (2011.01)
  H04N 21/436     (2011.01)
  H04N 21/478     (2011.01)
  H04N 5/445      (2011.01)

(52) U.S. Cl.
  CPC . *H04N 21/25808* (2013.01); *H04N 21/25833* (2013.01); *H04N 21/42684* (2013.01); *H04N 21/4314* (2013.01); *H04N 21/43615* (2013.01); *H04N 21/478* (2013.01); *H04N 2005/44565* (2013.01)

(58) Field of Classification Search
  CPC . H04L 67/306; H04L 67/325; H04L 12/2807; H04L 12/283
  USPC .......................... 709/204, 22, 227, 231, 248
  See application file for complete search history.

(56) References Cited

U.S. PATENT DOCUMENTS

| | | | |
|---|---|---|---|
| 2004/0117834 A1* | 6/2004 | Karaoguz | H04L 12/2803 725/80 |
| 2005/0068151 A1 | 3/2005 | Ushida | |
| 2005/0131931 A1 | 6/2005 | Kawajiri | |
| 2007/0067757 A1 | 3/2007 | Amemiya | |
| 2008/0275940 A1 | 11/2008 | Yamada | |
| 2009/0193463 A1* | 7/2009 | Choi | H04N 7/173 725/40 |
| 2009/0241149 A1 | 9/2009 | Yoshioka | |
| 2011/0086619 A1* | 4/2011 | George | H04M 1/72533 455/414.1 |
| 2011/0131258 A1* | 6/2011 | Cesario | G06F 17/30038 707/827 |
| 2011/0264495 A1* | 10/2011 | Hailey | G06F 3/0482 705/14.16 |
| 2011/0302607 A1* | 12/2011 | Warrick | H04L 12/2809 725/39 |
| 2012/0272149 A1* | 10/2012 | Lee | H04L 65/4084 715/716 |

FOREIGN PATENT DOCUMENTS

| | | |
|---|---|---|
| EP | 2226972 A2 | 9/2010 |
| EP | 1738562 B1 | 3/2011 |
| JP | 2005101887 A | 4/2005 |
| JP | 2005198252 A | 7/2005 |
| JP | 2007109213 A | 4/2007 |
| JP | 2008098708 A | 4/2008 |
| JP | 2008250598 A | 10/2008 |
| JP | 2010026964 A | 2/2010 |
| WO | 2008035603 A1 | 3/2008 |
| WO | 2008075618 A1 | 6/2008 |

OTHER PUBLICATIONS

International Search Report for corresponding Application PCT/JP2013/002217, dated Jul. 2, 2013.
European Search Report for corresponding Application 13772715.2, pp. 1-10, dated Sep. 28, 2015.
Office Action for corresponding JP Application 2012-084330, pp. 1-7, dated Mar. 10, 2015.
International Preliminary Report on Patentability and Written Opinion for corresponding Application PCT/JP2013/002217, dated Oct. 16, 2014.
Office Action for corresponding CN Application 201380016202.9, 7 pages, dated May 3, 2016.

* cited by examiner (a)

(b)

```
<html><meta http-equiv="refresh"
    content="0;url=http://192.168.XXX.XXX/setup/index.html"></html>
```

| BASIC SETTINGS | | △ |
|---|---|---|
| BASIC SETTINGS OF STORAGE UNIT | | |
| NETWORK SETTING | | |
| IP ADDRESS SETTING [?] | ◉ AUTO ACQUIRE  ○ MANUAL | APPLY |
| IP ADDRESS | 192 . 168 . 11 . 2 | |
| SUBNET MASK | 255 . 255 . 255 . 0 | |
| DEFAULT ROUTER | 192 . 168 . 11 . 1 | |
| PRIMARY DNS | . . . | |
| SECONDARY DNS | . . . | |
| MAC ADDRESS | 00:1F:A7:E5:7D:D5 | |
| OTHER SETTINGS | | |
| TIME [?] | 2011 ▼ YEAR 8 ▼ MONTH 29 ▼ DAY  15 ▼ HOUR 45 ▼ MINUTE 32 ▼ SECOND | APPLY |
| ENERGY SAVE MODE [?] | ○ ON  ◉ OFF | APPLY |
| INITIALIZE SETTING [?] | | INITIALIZE |
| SYSTEM SOFTWARE | Version 1.00 | |

FIG.7

| FILE SERVER SETTINGS | | |
|---|---|---|
| FILE SERVER FUNCTION SETTINGS | | |
| FILE SERVER NAME [?] | Storage123456 | APPLY |
| WORK GROUP [?] | WORKGROUP | APPLY |
| SHARED FOLDER NAME BUILT-IN HDD [?] | Share1 | APPLY |
| SHARED FOLDER NAME USB HDD [?] | Share2 | APPLY |

FIG. 9
(a)
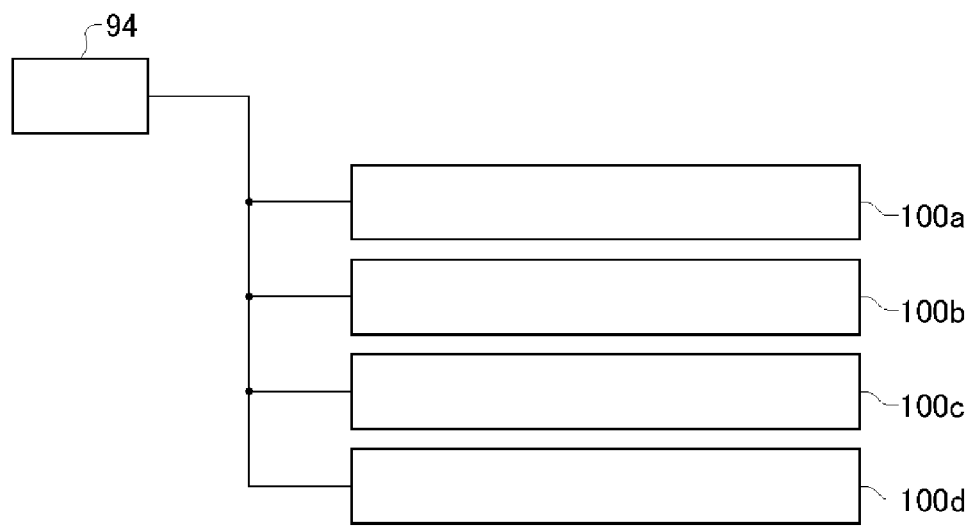
(b)
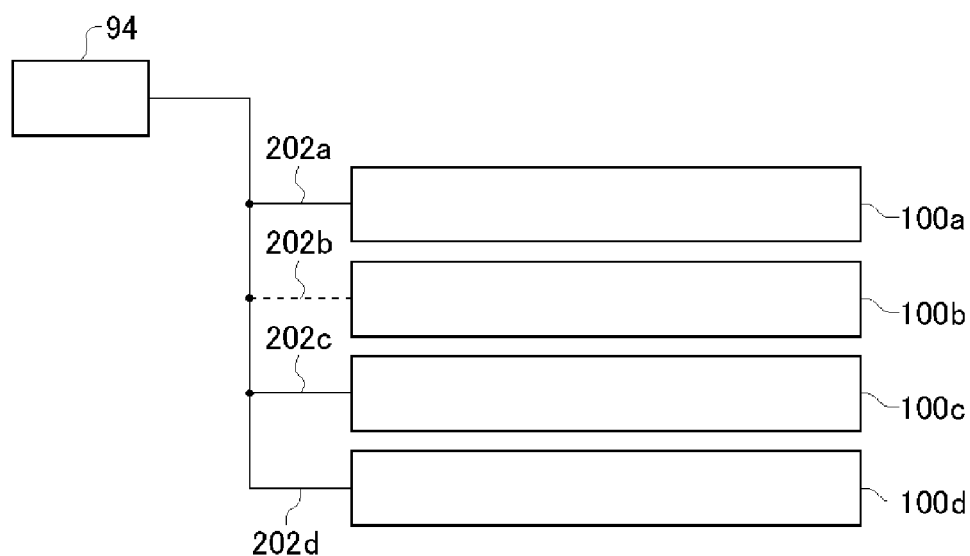

INFORMATION PROCESSING SYSTEM, INFORMATION PROCESSING APPARATUS, AND SERVER

TECHNICAL FIELD

The present invention relates to an information processing technology in an information processing system in which a server and a client are interconnected through a network.

BACKGROUND ART

A PVR (Personal Video Recorder) for recording video such as television broadcasting in a hard disk drive is widely popularized. Recent PVRs are compatible with both ground-wave digital broadcasting and satellite digital broadcasting and users can record desired programs by operating the user interface of these PVRs.

Besides, recently, it is a general practice to build a home storage system in which an NAS (Network Attached Storage) is connected to a computer network. The NAS is a file server having a hard disk drive and provides content files to a client apparatus through a TCP/IP network.

In the storage system, content recorded with a PVR is transferred to an NAS, thereby allowing the NAS to manage the recorded content in a centralized manner. Building the storage system makes it unnecessary for the user to replace PVRs for the purpose of expanding recording capacity.

SUMMARY

Technical Problems

The storage system described above does not require a PVR to record recorded content, so that the PVR may only have a function as a tuner. A PVR has various functions to enable the PVR to operate as a single unit; however, in order to manage content in a centralized manner in an NAS, the functions installed on the PVR often become over performance for the user to make the most of these functions. Also, because separate hardware units, PVR and NAS, are required, there occurs a problem of installation spaces.

In order to solve the above-mentioned problems, the inventors hereof have arrived at a novel information processing system. This information processing system preferably provides a user interface that allows a user to intuitively grasp client registration situations in a media server and connection relationships of media server and client.

It is therefore an objective of the present invention to provide an information processing technology that allows a user easily understand inter-device situations.

Solution to Problems

In order to solve the above-mentioned problems, in an information processing system practiced as one embodiment of the present invention, a media server and an information processing apparatus are interconnected through a network. The media server has a registration processing block for registering a client apparatus connectable to the media server and an information provision block for providing information associated with the registered client apparatus to the information processing apparatus. The information processing apparatus has an information acquisition block for acquiring client information from the media server and a display processing block for generating display data for displaying the acquired client information. The information acquisition block acquires, as client information, device identification information for identifying the client apparatus along with type identification information for identifying a type of the client apparatus, and the display processing block generates display data for displaying type identification information and device identification information.

Another embodiment of the present invention is an information processing apparatus. This apparatus is an information processing apparatus that displays information related with a client apparatus registered in a media server and has an information acquisition block for acquiring client information from the media server and a display processing block for generating display data for displaying acquired client information. The information acquisition block acquires, as client information, device identification information for identifying the client apparatus along with type identification information for identifying a type of the client apparatus, and the display processing block generates display data for displaying type identification information and device identification information.

Still another embodiment of the present invention is a server for providing display data to an information processing apparatus. This server has a registration processing block for registering a client apparatus connectable to the server into a storage block and an information provision block for reading two or more pieces of client information registered in the storage block and generating display data for displaying type identification information for identifying a type of the client apparatus and device identification information for identifying the client apparatus by relating these pieces of information with each other for each client apparatus, thereby providing the generated display data to the information processing apparatus.

It should be noted that any conversions of any combinations of the component elements described above and expressions of the present invention between method, apparatus, system, recording medium, and computer program are also valid as embodiments of the present invention.

BRIEF DESCRIPTION OF DRAWINGS

FIG. 7 is a diagram illustrating one example of a file server settings screen.

FIG. 9 includes (a) a diagram illustrating one example of a tree structure and (b) a diagram illustrating another example of a tree structure.

DESCRIPTION OF EMBODIMENT

With an information processing system related with the present embodiment, a storage apparatus having an NAS function and a recorder function is proposed. One unit of storage apparatus that is capable of functioning as both NAS and PVR accordingly enhances the saving of installation space and flexibility of maintenance. The storage apparatus is configured such that a recorder user interface is not arranged but an application dedicated to a client apparatus that accesses the storage apparatus is installed to have the client apparatus provide a recorder user interface. This configuration allows the easy expansion of the recording capacity of the entire system by increasing the number of storage apparatuses connected to a network and, at the same time, allows the user to operate the storage apparatuses by use of a same user interface regardless of the number of storage apparatuses because the recorder user interface is provided from the client apparatus.

In the information processing system of the present embodiment, the storage apparatus uses the NAS function to provide a media server function for providing content recorded by the recorder function to the client apparatus and a general-purpose file server function. If the user uses the storage apparatus as a file server, the user is restricted from accessing the recorded content; if the user uses the storage apparatus as a media server, the user can view the recorded content. Thus, in the storage apparatus, recorded content and other types of content are separately recorded.

As described above, the storage apparatus of the present embodiment has varies kinds of functions. For the user to appropriately set these functions, the storage apparatus is configured to have a Web application for setting these functions, thereby allowing the user to set the various kinds of functions in the storage apparatus by executing the Web application from the information processing apparatus. In the present embodiment, the Web application for function setting provides a user interface that allows the user to intuitively understand the situations of registration of the client apparatus in the storage apparatus and the connecting relation between the storage apparatus and the client apparatus.

Figure 1:
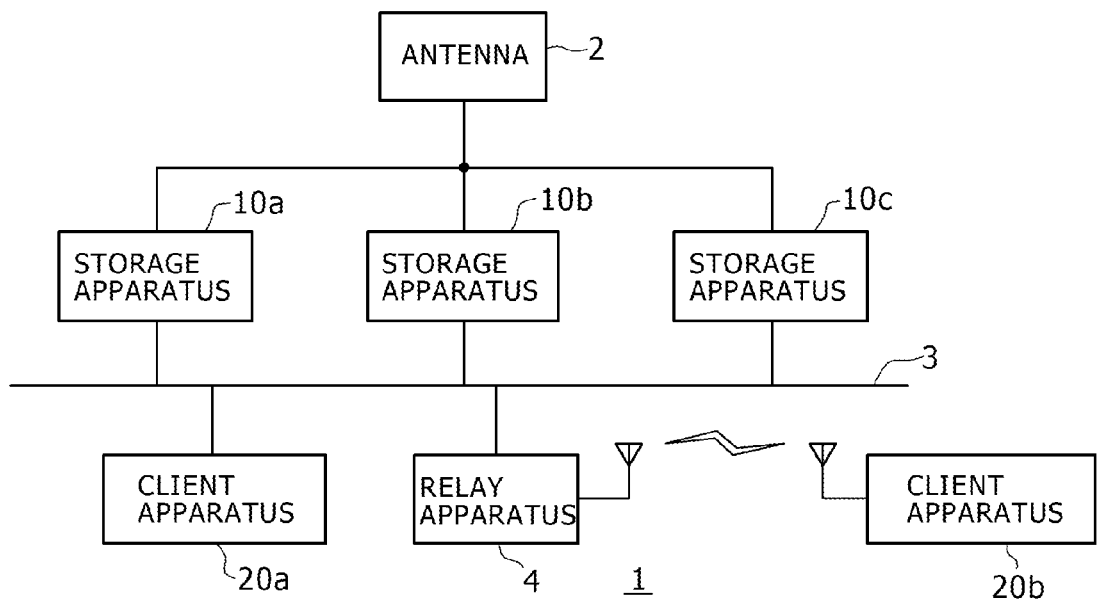
FIG. 1 is a diagram illustrating an approximate configuration of an information processing system practiced as one embodiment.

Referring to FIG. 1, there is shown an approximate configuration of an information processing system 1 practiced as one embodiment. In the information processing system 1, client apparatuses 20a and 20b (if there is no need for making distinction, these client apparatuses are generically referred to as a client apparatus 20) and storage apparatuses 10a, 10b, and 10c (if there is no need for making distinction, these storage apparatuses are generically referred to as a storage apparatus 10) are connected to a network 3. It should be noted that FIG. 1 shows two or more client apparatuses 20a and 20b and two or more storage apparatuses 10a, 10b, and 10c; however, only one client apparatus 20 and only one storage apparatus 10 may be arranged in the information processing system 1.

The storage apparatus 10 has a NAS function and a recorder function. The storage apparatus 10 has a hard disk drive which has a recording capacity of 300 GB or more, for example. It should be noted that the storage apparatus 10 may be configured by having a recording medium other than a hard disk drive, a flash memory for example. Further, the storage apparatus 10 is not connected to a display apparatus but has a LED for presenting operation states and so on to the user. In the information processing system 1, the storage apparatus 10 functions as a media server that stores and distribute two or more kinds of content such as still image, moving image, and music and the client apparatus 20 that is compatible with DLNA (Digital Living Network Alliance) can access the storage apparatus 10 to get and reproduce recorded content. It should also be noted that the storage apparatus 10 can function as a general-purpose file server.

In order to realize a recorder function, the storage apparatus 10 connects to an antenna 2 and has a three-wave tuner of ground-wave digital broadcasting wave, BS digital broadcasting wave, and CS digital broadcasting wave. It should be noted that, in the approximate configuration of a network environment shown in FIG. 1, a broadcast signal from the antenna 2 is branched into the storage apparatus 10a through the storage apparatus 10c; however, it is also practicable that each of the storage apparatuses 10 has an antenna input terminal and an antenna output terminal, the antenna input terminal of the storage apparatus 10a being connected to the antenna 2, the antenna output terminal of the storage apparatus 10a being connected to the antenna input terminal of the storage apparatus 10b, and the antenna output terminal of the storage apparatus 10b being connected to the antenna input terminal of the storage apparatus 10c, for example, thereby allowing the storage apparatuses 10a, 10b, and 10c to receive broadcast signals.

In the present embodiment, the storage apparatus 10 operates as a single-tuner PVR and can record one program. In the information processing system 1, connecting one unit of the storage apparatus 10 to the network 3 makes the storage apparatus 10 function as a single-tuner PVR, connecting two units of the storage apparatus 10 makes the storage apparatus 10 function as a double-tuner PVR, and connecting three units of the storage apparatus 10 makes the storage apparatus 10 to function as triple-tuner PVR. As the number of connected units of the storage apparatus 10 is increased, the number of programs that can be simultaneously recorded increases and the recording capacity in the information processing system 1 increases. Thus, in the present embodiment, the information processing system 1 high in expandability is provided in which simply increasing the number of storage apparatuses 10 allows the increase in the number of tuners and the recording capacity. It should be noted that, because the storage apparatus 10 operates also as an ordinary file server, the capability of easily increasing the recording capacity leads to the enhanced flexibility as an NAS system.

The client apparatus 20 is an information processing apparatus that connects to a display apparatus or is configured to have a display. The client apparatus 20 may be a stationary game machine connected to a display apparatus, a desktop personal computer, a portable game machine integrated with a display, or a note-type personal computer.

The client apparatus 20 accesses the media server function of the storage apparatus 10 to get and reproduce a recorded content file. The client apparatus 20 may be connected by cable to the network 3 through a relay apparatus 4 or connected wirelessly to the network 3 through the relay apparatus 4. The relay apparatus 4 may be a hub or a switch that relays information between devices on the network 3 or a router that connects to an external network. Having a router function, the relay apparatus 4 allows a client apparatus connected to an external network to access the storage apparatus 10. It should be noted that the relay apparatus 4 in the present embodiment is configured as a so-called wireless LAN router having a wireless LAN communication function and a router function.

In order to provide a user interface for the user to operate the storage apparatus 10 functioning as a PVR, the client apparatus 20 installs an application dedicated to the control of the recorder function of the storage apparatus 10. Consequently, the user can use the storage apparatus 10 as a recorder and executes operations of program timer-recording and recorded program viewing through the user interface provided by the client apparatus 20.

If two or more units of storage apparatus 10 are connected to the network 3, the management of each storage apparatus 10 is realized by a recorder operation application installed on the client apparatus 20. Because the storage apparatus 10 has no user interface for recorder, the storage apparatus 10 need not have a video output, thereby saving the production cost. In addition, by simply connecting the storage apparatus 10 to the network 3, the user can easily increase the recording capacity in the information processing system 1 and the number of programs that can be simultaneously recorded, thereby making the information processing system 1 highly flexible.

Figure 2:
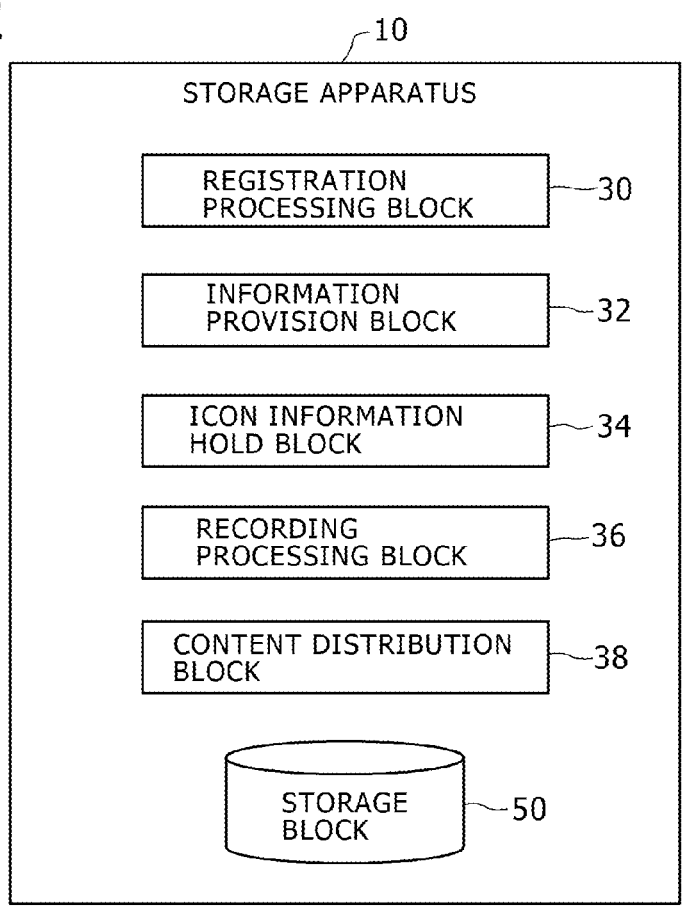
FIG. 2 is a functional block diagram illustrating a storage apparatus.

Referring to FIG. 2, there are shown functional blocks of the storage apparatus 10. The storage apparatus 10 has a registration processing block 30, an information provision block 32, an icon information hold block 34, a recording processing block 36, a content distribution block 38, and a storage block 50. The registration processing block 30 registers the client apparatus 20 connectible to a media server into the storage block 50. The recording processing block 36 records a broadcast program and the content distribution block 38 distributes recorded content to the client apparatus 20. In terms of hardware components, these configurations are realized by a CPU, a memory, a program loaded in the memory and the like of a given computer; here, the functional blocks to be realized in cooperation with these components are depicted. Therefore, it would be obvious to those skilled in the art that these functional blocks may be realized in various manners by only hardware, only software, or in combinations thereof.

Figure 3:
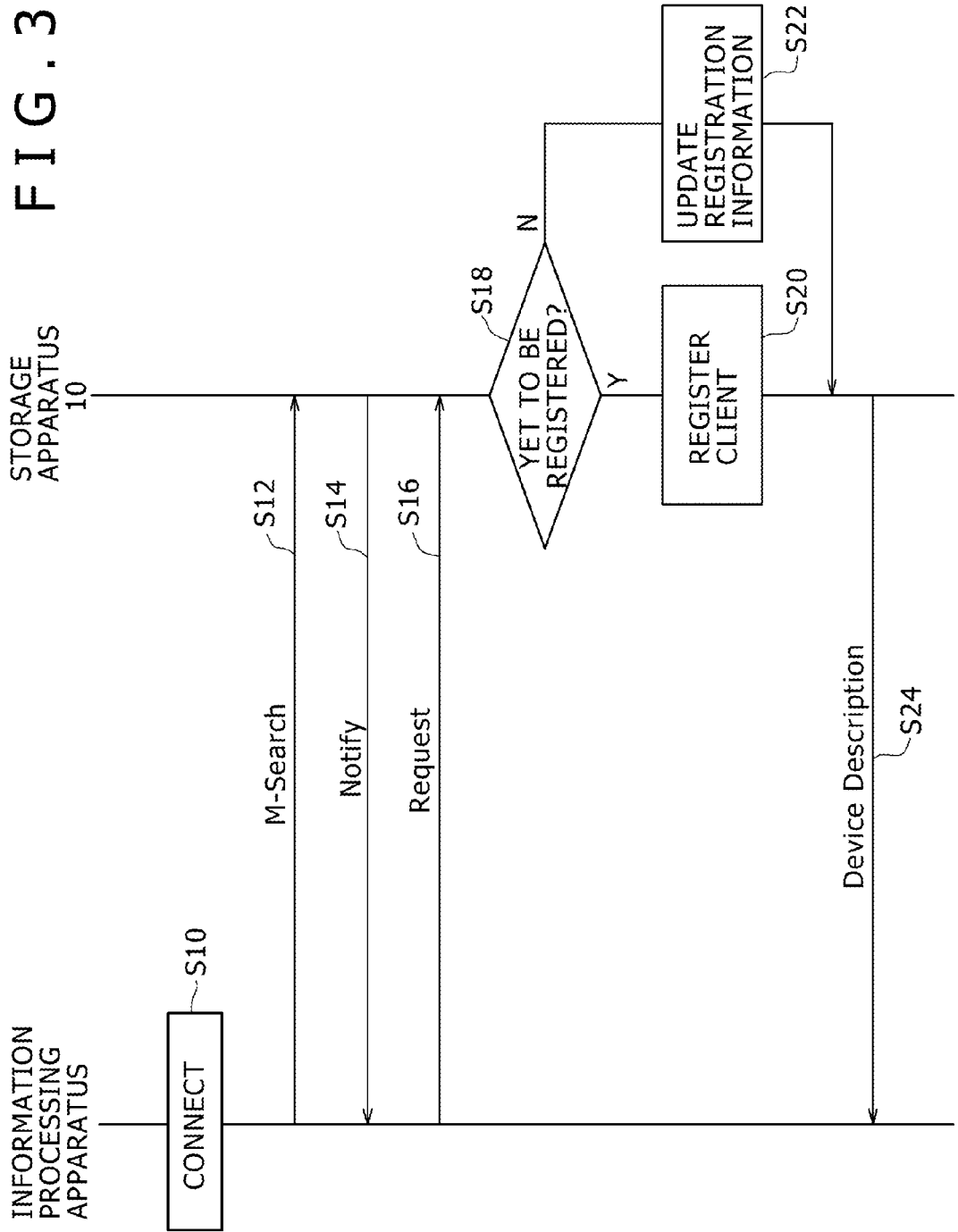
FIG. 3 is a flowchart indicative of registration processing and information acquisition processing of an information processing apparatus by the storage apparatus.

Referring to FIG. 3, there is shown a flowchart indicative of registration processing and information acquisition processing of an information processing apparatus by the storage apparatus 10. In the storage apparatus 10 functioning as a media server, the registration processing block 30 executes the following registration processing and information acquisition processing with an information processing apparatus compatible with DLNA.

In DLNA, the UPnP (Universal Plug and Play) protocol is employed. When an information processing apparatus is connected to the network 3 (S10), an IP address is allocated by DHCP. Next, discovery processing based on SSDP (Simple Service Discovery Protocol) is executed and, when the information processing apparatus makes an inquiry by multicast transmitting a search packet (M-Search) (S12), the storage apparatus 10 makes a reply to the inquiry, returning a notification packet (Notify) (S14). Receiving the notification packet, the information processing apparatus transmits a packet (Request) for requesting a device description file to the storage apparatus 10 (S16). This request packet includes information associated with the information processing apparatus, this information at least including information for identifying a type of the information processing apparatus (type identification information) and information for identifying the information processing apparatus (device identification information).

The type identification information is information for representing the name of an information processing apparatus; to be more specific, the type identification information may be text information representative of the product name of an information processing apparatus. It should be noted that the type identification information may be information indirectly representative of the name of an information processing apparatus; for example, the type identification information may be a product code set to an information processing apparatus that the storage apparatus 10 can convert into the name of the information processing apparatus. The name of the information processing apparatus is for identifying the product name and does not provide mutual recognition between the information processing apparatuses of the same type.

On the other hand, unlike the type identification information, the device identification information is information for identifying an information processing apparatus. The device identification information is an identifier for identifying an information processing apparatus and may be a MAC (Media Access Control) address for example. Thus, the device identification information is preferably information unique to an information processing apparatus or, aside therefrom, may be information with which the user can identify an information processing apparatus with respect to a use situation of the information processing apparatus. For example, the device identification information may be a most recent date (a most recent access date) on which an information processing apparatus accessed the storage apparatus 10. If a name (a nickname for example) set by the user is allocated to an information processing apparatus, the device identification information may be that nickname.

Receiving the request packet, the storage apparatus 10 determines whether the information processing apparatus has been registered as a client (S18). If the information processing apparatus is found yet to be registered as a client (Y of S18), then the storage apparatus 10 registers this information processing apparatus as a client (S20) and stores the type identification information and the device identification information included in the request packet into the storage block 50 as registration information. The client registration into the storage apparatus 10 allows the information processing apparatus to access a media server to access a content file.

On the other hand, if the information processing apparatus has already been registered as a client (N of S18), then changed information from among the information included in the request packet is updated and registered (S22). Consequently, the registration information of the client apparatus 20 is maintained in a most recent state. The storage apparatus 10 transmits a file (Device Description) describing the function and information to be provided by the storage apparatus 10 to the client apparatus 20 (S24). Thus, the storage apparatus 10 can get the information associated with the client apparatus 20.

As described above, the registration processing block 30 registers an information processing apparatus newly connected to the storage apparatus 10 functioning as a media server as a client and gets the most recent information from the registered client apparatus 20. The registration processing block 30 executes the above-mentioned registration processing and/or information acquisition processing every time the client apparatus 20 that is a DLNA compatible device is connected to the network 3. Consequently, when the user newly purchases an information processing apparatus compatible with DLNA and connects this information processing apparatus to the network 3, the registration processing block 30 automatically registers this DLNA-compatible device as a client, thereby allowing the user to quickly browse recorded content from this information processing apparatus. It should be noted that automatic registration or manual registration may be set by the user as desired on a media server settings screen to be described later.

As described above, the storage apparatus 10 of the present embodiment has no user interface for a recorder and therefore realizes the NAS function and the recorder function with a very simple structure. The following describes a method of setting the NAS function of the storage apparatus 10; to be more specific, a method of setting the file server function and the media server function. In setting each of these functions, a setting screen that provides a user interface is provided to the user and the user executes input, confirmation, change, and other operations on the setting screen.

The storage apparatus 10 of the present embodiment has a Web application for executing setting (setup). The user activates the function setting Web application held in the storage apparatus 10 from the information processing apparatus that is operated by the user. The user can access the setting Web application via the browser to execute a setting operation for setting the storage apparatus 10. It should be noted that the information processing apparatus that is operated by the user may be the client apparatus 20 already registered in a media server or may be another terminal apparatus.

For example, if the information processing apparatus operated by the user is a personal computer (PC), then the user can search for the storage apparatus 10 to be connected to the network 3 by use of the file server function of the PC. To be more specific, by use of a search function provided by the file server function, the user enters the name (the file server name) of the storage apparatus 10 that functions as a file server in a search window as a search word, upon which the file server function of the PC searches the network 3 for the corresponding storage apparatus 10 and displays the folder of the storage apparatus 10 on the browser.

In the information processing system 1, the file server name of the storage apparatus 10 is uniquely set. For example, a seal marked with an identification code is labeled to the housing of the storage apparatus 10 for identification by the user. The identification code may be impressed on the housing of the storage apparatus 10 or written to a document or the like packed together with the storage apparatus 10 at purchase. In the present embodiment, in order to make a file server name a unique value, a rule is predetermined that a character string formed by adding part (lower six digits for example) of the MAC address of the storage apparatus 10 concerned to the identification code is used as the file server name. In accordance with the predetermined rule, the storage apparatus 10 publicizes the file server name thereof on the network; therefore the search word to be entered by the user must comply with this rule.

Figure 4:
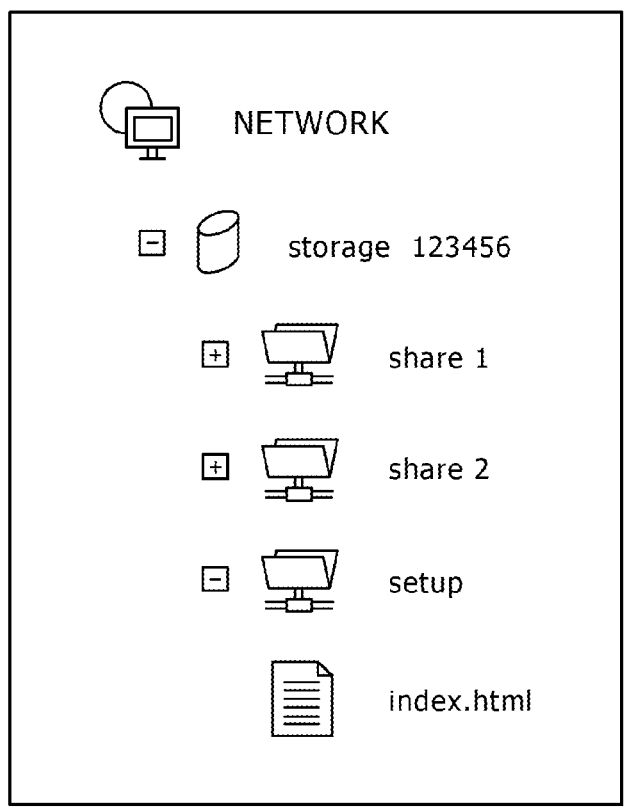
FIG. 4 includes (a) a diagram illustrating a search result displayed on a display by a web browser of the information processing apparatus and (b) a diagram illustrating an index file.

FIG. 4(a) shows a search result that are shown on a display by a web browser of an information processing apparatus. When the user enters a character string "storage123456" into the search window, the file server function of the information processing apparatus detects the storage apparatus 10 connected to the network 3 under the name of "storage123456." This is an example in which the identification code of the storage apparatus 10 is "storage" and the lower six digits of the MAC address is "123456."

By this search result, the user can confirm the existence of three folders publicized on the network 3 by the file server function of the storage apparatus 10. Folder "share1" is formed on an HDD incorporated in the storage apparatus 10 and folder "share2" is formed on an external HDD (USB HDD). Folder "setup" has the role of a lead of a function setting Web application; when file (index.html) contained in this folder is opened, redirection to the setting Web application is done.

FIG. 4(b) shows an index file. In this index file, "192.168.XXX.XXX" is indicative of the IP address of the storage apparatus 10. In the network 3, the IP address of the storage apparatus 10 may be changed in various situations. For example, once the power to the storage apparatus 10 is turned off, a new IP address is allocated by a broadband router or the like upon the next turn-on operation. Also, if the power to a broadband router is turned off, a new IP address is allocated upon the restart of the broadband router.

For this reason, if the IP address allocated to the storage apparatus 10 has been changed, the function setting Web application of the storage apparatus 10 updates the IP address in the index file shown in FIG. 4(b). Thus, embedding the own IP address into the index file by the storage apparatus 10 as a Web server allows the user to easily access the Web application of the storage apparatus 10 without being aware of the IP address of the storage apparatus 10, thereby activating the Web application.

Figures 5, 6:
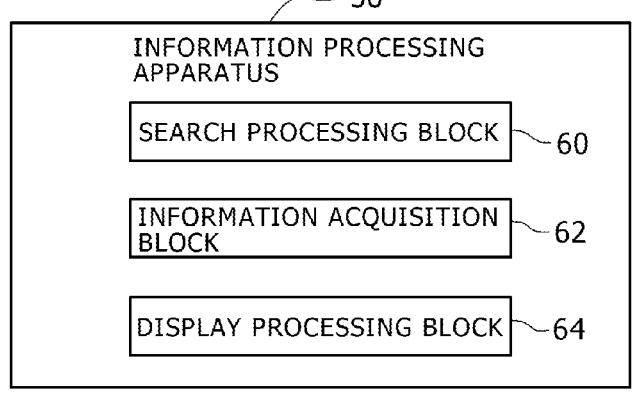
FIG. 5 is a functional block diagram illustrating the information processing apparatus.
FIG. 6 is a diagram illustrating one example of a basic settings screen.

FIG. 5 shows functional blocks of an information processing apparatus 58. The information processing apparatus 58 is a terminal apparatus having a browser function and activates the Web application in the storage apparatus 10. The information processing apparatus 58 has a search processing block 60, an information acquisition block 62, and a display processing block 64, the information acquisition block 62 and the display processing block 64 realizing the browser function. In terms of hardware components, these configurations are realized by a CPU, a memory, a program loaded in the memory and the like of a given computer; here, the functional blocks to be realized in cooperation with these components are depicted. Therefore, it would be obvious to those skilled in the art that these functional blocks may be realized in various manners by only hardware, only software, or in combinations thereof. The information processing apparatus 58 may be the client apparatus 20 registered in a media server.

The search processing block 60 searches the network 3 for the storage apparatus 10 on the basis of the input from the user. Upon detecting the storage apparatus 10, the search processing block 60 displays a folder configuration of the file server function in the storage apparatus 10 onto a display (refer to FIG. 4). On this display screen, when the user selects "index.html," the search processing block 60 reads an HTML file indicated in FIG. 4(b) and accesses an area indicated by URL, thereby activating the Web application.

In the storage apparatus 10 shown in FIG. 2, the function of the information provision block 32 is realized by the Web application. When the Web application is activated by the information processing apparatus 58, the information provision block 32 provides information for configuring a user interface screen to the information processing apparatus 58. To be more specific, the information provision block 32 provides information for generating setting screens for setting various functions in the storage apparatus 10 to the information processing apparatus 58. In the information processing apparatus 58 shown in FIG. 5, the information acquisition block 62 gets screen configuration information from the information provision block 32 and the display processing block 64 generates display data for displaying a setting screen, thereby displaying the setting screen on a display connected to the information processing apparatus 58.

FIG. 6 shows one example of a basic settings screen. If item "IP address setting" is "Auto acquire," then the storage apparatus 10 automatically acquire the IP address. If item "IP address setting" is "Manual," then the user manually inputs the IP address. It should be noted that, as described above, if the IP address is changed, the storage apparatus 10 must automatically update the IP address included in the HTML file of the Setup folder. On the basic settings screen, the user manually sets time, power save mode on/off, and so on.

FIG. 7 shows one example of a file server settings screen. Here, "storage123456" is set as a file server name. As described above, in searching for the storage apparatus 10 from the information processing apparatus 58, this file server name can be used as the search word to detect the storage apparatus 10. It should be noted that, in an information processing apparatus 58 other than a PC, such as a game machine for example, a unique application for file server search may be incorporated to build a mechanism that allows easy detection of the storage apparatus 10.

Figure 8:
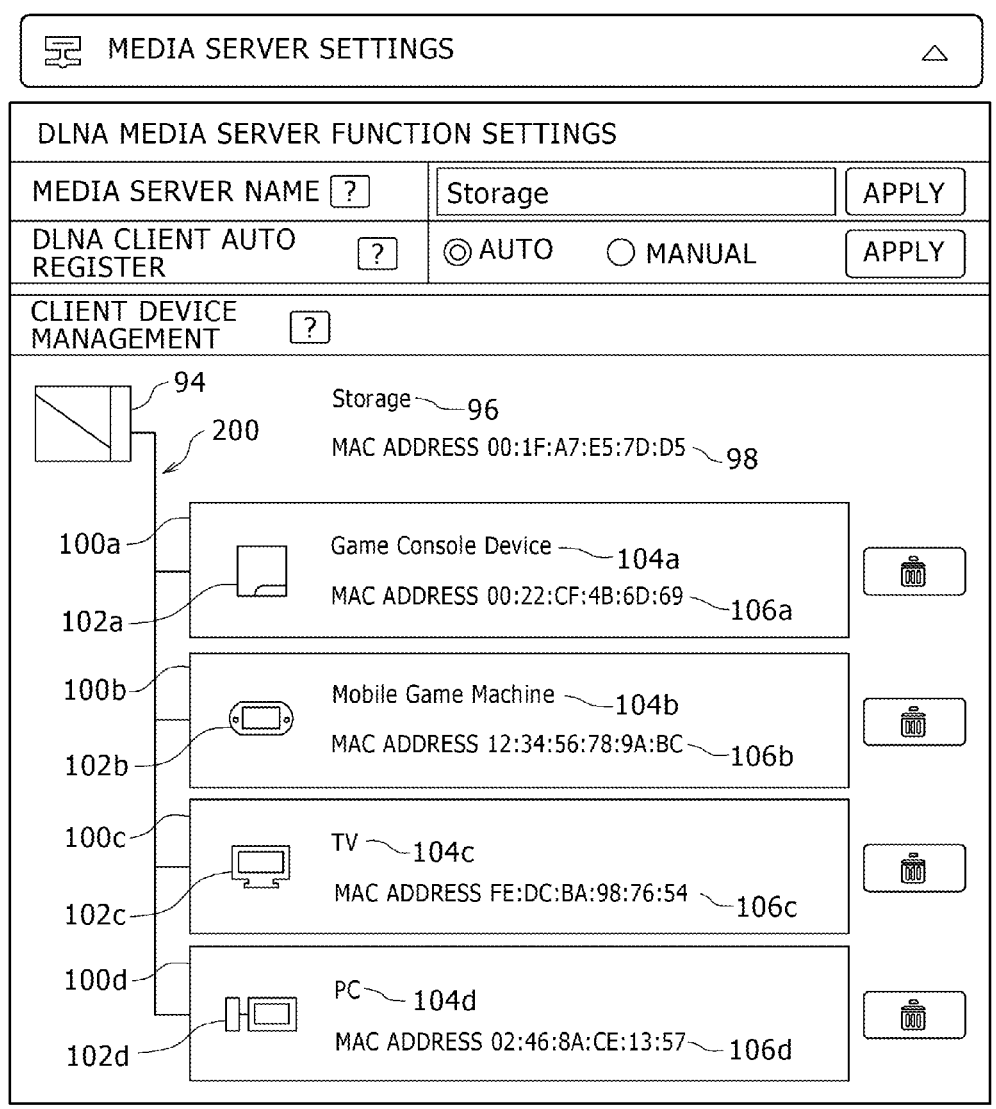
FIG. 8 is a diagram illustrating one example of a media server settings screen.

FIG. 8 shows one example of a media server settings screen. In the storage apparatus 10, the information provision block 32 (refer to FIG. 2) provides information for configuring a media server settings screen to the information processing apparatus 58. This screen configuration information (data for display) includes information (client information) associated with the client apparatus 20 registered in the media server. Here, the client information at least includes information (type identification information) for identifying the type of the client apparatus 20 and information (device identification information) for identifying the client apparatus 20. The device identification information is preferably information that allows the user to uniquely identify the client apparatus 20.

To be more specific, the information provision block 32 reads two or more pieces of client information registered in the storage block 50 and generates display data for displaying type identification information and device identification information by relating these pieces of information with each other for each client apparatus 20, providing the generated display data to the information processing apparatus 58.

In the storage apparatus 10, the icon information hold block 34 holds a DLNA-compatible device and icon information of this DLNA-compatible device by relating them with each other, in other words, the type identification information of the client apparatus 20 and the icon information of this client apparatus 20 by relating these pieces of information with each other. The icon information may be the URL of the storage block 50 in which the icon information is stored or image information itself. Referencing the icon information hold block 34, the information provision block 32 extracts the icon information from the type identification information of the client apparatus 20 and provides the extracted icon information to the information processing apparatus 58 together with the type identification information and the device identification information as the client information. It should be noted that, if two or more client apparatuses 20 are registered in the media server, then the information provision block 32 provides two or more pieces of client information to the information processing apparatus 58. In the information processing apparatus 58, the information acquisition block 62 gets the client information and the display processing block 64 generates display data for displaying the acquired client information, thereby displaying the client information on a display.

In the present embodiment, the Web application generates screen configuration information for displaying a connection relation between the storage apparatus 10 and the client apparatus 20 by a tree structure with the storage apparatus 10 that is a media server being the root node in the display of the client apparatus 20. With a tree structure 200 shown in FIG. 8, an icon image 94 is connected with lines to client information display areas 100a, 100b, 100c, and 100d (hereafter generically referred to as "a client information display area 100" unless otherwise noted) where information about the client apparatus 20 is displayed, with the icon image 94 of the storage apparatus 10 having a media server name 96 of "storage" being the origin. The line connecting the icon image 94 with the client information display area 100 is representative that both are connectible on the network 3. Device identification information 98 is indicative of the MAC address of the storage apparatus 10.

The client information display area 100a shows information about the client apparatus 20 with type identification information 104a being "GameConsoleDevice" and device identification information 106a being "MAC address 00.22.CF.4B.0D.69." At the left end of the client information display area 100a, an icon image 102a of the client apparatus 20 is displayed.

In the client information display area 100a shown in FIG. 8, the type identification information 104a is representative of general information for identifying apparatus type; it is also practicable for the type identification information 104a to be representative of a name (product name) of an apparatus. Further, for the device identification information 106, a MAC address is shown; in the case where a nickname is set to the client apparatus 20, the device identification information 106 may be this nickname. Still further, not only the information unique to the apparatus itself but also the most recent date and time (the most recent access date and time) on which the client apparatus 20 accessed the storage apparatus 10 may be displayed as the device identification information 106. The information for the user to identify the client apparatus 20, such as apparatus-unique information or an apparatus operation log, is displayed in the client information display area 100a as the device identification information 106a.

When the information acquisition block 62 gets the client information including type identification information, device identification information, and icon information from the information processing apparatus 58, the display processing block 64 generates display data for displaying the icon image 102a, the type identification information 104a, and the device identification information 106a in the client information display area 100a for each client apparatus 20. It should be noted that if the information acquisition block 62 gets information associated with two or more client apparatuses 20, the display processing block 64 generates display data for displaying an icon image 102, type identification information 104, and device identification information 106 in a client information display area 100 for each client apparatus 20.

The client information display area 100b displays an icon image 102b, type identification information 104b ("MobileGameMachine"), and device identification information 106b (MAC address) of a client apparatus. Likewise, the client information display area 100c displays an icon image 102c, type identification information 104c ("TV"), and device identification information 106c (MAC address) of a client apparatus and the client information display area 100d displays an icon image 102d, type identification information 104d ("PC"), and device identification information 106d (MAC address) of a client apparatus. It should be noted that in the media server settings screen shown in FIG. 8, the type identification information 104 is indicated as a general apparatus type such as a game machine, a TV or the like; it is also practicable to display information, such as a product name for example, that allows the user to intuitively understand the type of an apparatus.

A shown in FIG. 3, in registering an information processing apparatus as a client in the storage apparatus 10, the information that can be transmitted from the information processing apparatus to the storage apparatus 10 is limited. An information processing apparatus includes the information for identifying the information processing apparatus into a request packet in S16 but, on the UPnP protocol, cannot include an icon image at that moment. In order to circumvent this problem, the storage apparatus 10 has the icon information hold block 34 so that extraction of icon information from the type identification information of the client apparatus 20 is enabled for the information provision block 32 to provide the icon information of the registered client apparatus 20 to the information processing apparatus 58. An icon image is prepared for each DLNA device and formed with a picture or text that allows the user to understand the type of the client apparatus 20 at a glance. Displaying the icon image 102 along with the type identification information 104 in the client information display area 100 allows the user to intuitively recognize the apparatus type.

Further, in the media server settings screen of the present embodiment, the device identification information 106 is displayed as the information associated with the client apparatus 20. Consequently, if client apparatuses 20 of the same type are registered in the storage apparatus 10, for example, the user can distinguish one client apparatus 20 from another. For example, if there are two or more portable game machines of the same type in home, it is important to display the device identification information 106 such as most recent access date and time and so on also in order to identify which of these game machines is displayed in the client information display area 100.

It should be noted that the storage apparatus 10 may provide information associated with the user thereof as the device identification information 106. Especially, if the client apparatus 20 is a game machine, the game machine may be shared by two or more users. Hence, in order to set access privilege to a media server for each of the users, the registration processing block 30 in the storage apparatus 10 registers an information processing apparatus as a client for each user. For example, if the accounts of users A and B are set to one unit of game machine, then the registration processing block 30 registers this game machine as the game machine of user A and the game machine of user B as clients and the information provision block 32 generates screen configuration information for displaying each piece of client information, providing the generated screen configuration information to the information processing apparatus 58. In the information processing apparatus 58, the display processing block 64 generates display data for displaying a media server settings screen that includes the client information display area 100 of each user. For example, if user A is a parent and user B is a child and user A wants to disable access to the media server of user B, then user A may press a delete button on the right side of the client information display area 100 of user B to prevent user B from viewing recorded content through the game machine.

In the above-mentioned example, "DLNA client auto registration" function is set to "Auto" on the media server settings screen; if this function is set to "Manual," user A may not register the game machine of user B as a client, thereby preventing user B from viewing recorded content through the game machine.

It should be noted that if the information processing apparatus 58 displaying a setting screen is the client apparatus 20, then the display processing block 64 may generate display data for displaying the client information of the information processing apparatus 58 on the display in a manner different from another client apparatus 20. Consequently, the user operating a setting screen is able to recognize the information processing apparatus 58 that this user is using among a client list. For example, the user can easily recognize the information processing apparatus 58 that this user is using by changing display colors of the client information display area 100 of the information processing apparatus 58 or client information or blinking the client information display area 100 itself.

FIG. 9(a) shows one example of a tree structure for displaying a connection relation between a media server and client apparatuses in a media server setting screen. This tree structure 200 is obtained by schematizing that of the media settings screen shown in FIG. 8. In the tree structure 200, a line is drawn from one root node that is the origin to a node connected to that root node. With a tree structure, the root node and two or more nodes are interconnected with lines, so that, as with the present embodiment, a tree structure is a very excellent presentation technique for the user to confirm the connection relations of the client apparatuses 20 with a media server being the origin.

In the information processing apparatus 58, when the information acquisition block 62 gets two or more pieces of client information from the storage apparatus 10, the display processing block 64 displays the connection relation between the storage apparatus 10 and two or more client apparatuses 20 in a tree structure with the storage apparatus 10 being the root node by using the acquired client information.

To be more specific, the information provision block 32 (refer to FIG. 2) to be realized by a Web application reads two or more pieces of client information registered in the storage block 50 and, by use of the read client information, generates display data for displaying a connection relation between the server and client apparatuses by a tree structure with the media server being the root node. The information provision block 32 provides the generated display data to the information processing apparatus 58 as screen configuration information that configures the media server settings screen. When the information acquisition block 62 gets the display data, the display processing block 64 displays the information associated with the client apparatus 20 on a display by the browser function in a tree structure with the media server being the root node. In this example, a connection line is drawn to each client apparatus 20 with the icon image 94 of the storage apparatus 10 being the origin. Representing the connection relation between the media server and the client apparatuses 20 in a tree structure allows the realization of a user interface suitable for the user to intuitively understand the connection relation.

FIG. 9(b) shows another example of a tree structure. Unlike the tree structure 200 shown in FIG. 9(a), a connection line 202b between the icon image 94 and the client information display area 100b is a dashed line in a tree structure 200a shown in FIG. 9(b). It should be noted that connection lines 202a, 202c, and 202d between the icon image 94 and the client information display areas 100a, 100c, and 100d, respectively, are solid lines.

In registering an information processing apparatus as a client, the storage apparatus 10 receives information indicative of connection type from the client apparatus 20 and stores the received information in the storage block 50 as registration information. Here, the information indicative of connection type is information for identifying whether the connection is wired connection or wireless connection. In the storage apparatus 10, according to the information indicative of connection type, the information provision block 32 generates display data that defines the type of the connection line 202 between the icon image 94 and the client information display area 100. Consequently, in the information processing apparatus 58, the display processing block 64 can connect the icon image 94 indicative of a media server with the client information display areas 100 indicative of client apparatuses 20 with the lines in accordance with the connection type between the media server and the client apparatuses 20. In this example, if the server and the clients are interconnected in a wired manner, the connection lines are solid lines; if the server and the clients are interconnected in a wireless manner, the connection lines are dashed lines. It should be noted that it is only necessary that the user can recognize a difference in connection type through a difference in the lines. For example, one connection type may be distinguished from another by colors of the lines.

Figure 10:
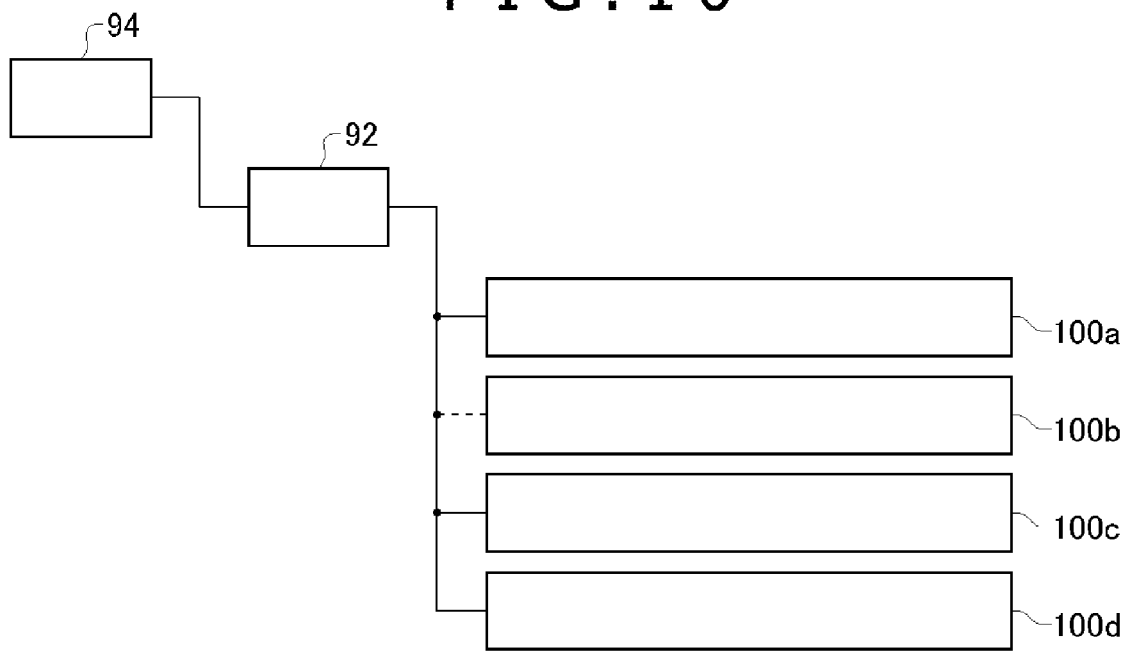
FIG. 10 is a diagram illustrating still another example of a tree structure.

FIG. 10 shows another example of a tree structure. Unlike the tree structure 200a shown in FIG. 9(b), an icon image 92 of the relay apparatus 4 is inserted between the icon image 94 and the client information display areas 100 in a tree structure 200b shown in FIG. 10. That is, in the tree structure 200b shown in FIG. 10, a network environment that includes the relay apparatus 4 is represented.

The relay apparatus 4 of the present embodiment is configured as a so-called wireless LAN router having a wireless LAN communication function and a router function. This wireless LAN router has a function of getting information associated with each device connected thereto and also connection type information for identifying how this router is connected with each device, wired or wireless. The wireless LAN router provides a list of device information and connection type information to the storage apparatus 10. Consequently, the information provision block 32 can generate display data for the tree structure 200b shown in FIG. 10. Thus, letting a wireless LAN router have a function of getting connected device information and notifying the storage apparatus 10 of the acquired connected device information allows displaying of a tree structure that represents a network environment including the relay apparatus 4.

It is also practicable for the storage apparatus 10 to transmit a packet with an IP survival time field changed from 1 to n to each device on the network 3 and check each device for replay situations, thereby determining the existence of routers.

The storage apparatus 10 transmits packets with various survival periods set to the client apparatuses 20a, 20b, and 20c. First, a packet with survival period 2 is transmitted. At this moment, it is assumed that the client apparatus 20a return a reply packet and the client apparatuses 20b and 20c do not return reply packets. Consequently, the storage apparatus 10 expects that there is one router between the client apparatus 20a and the storage apparatus 10.

Next, the storage apparatus 10 transmits a packet with survival period 3. At this moment, it is assumed that the client apparatuses 20a and 20b return reply packets and the client apparatus 20c does not return a reply packet. Consequently, the storage apparatus 10 expects that there are two routers between the client apparatus 20b and the storage apparatus 10.

Further, the storage apparatus 10 transmits a packet with survival period 3. It is assumed that the client apparatuses 20a and 20b obviously return reply packets and the client apparatus 20 also return a reply packet. Consequently, the storage apparatus 10 expects that there are three routers between the client apparatus 20c and the storage apparatus 10.

As described above, the storage apparatus 10 can transmit packets that include survival periods to the devices on the network 3 and receive reply packets to expect how many routers there are between the storage apparatus 10 and each of the devices. Thus, detecting a network environment by the storage apparatus 10 allows a Web application to represent connection relations between media server, router, and the client apparatus 20 in a tree structure.

It should be noted that, in the information processing system 1, two or more storage apparatuses 10 can connect to the network 3. In this case, storage apparatus information of the storage apparatuses 10 other than the storage apparatus 10 that provides the root node may be displayed in an area parallel to the client information display area 100 although these storage apparatuses 10 are not clients.

Thus, the present invention has been described on the basis of one embodiment thereof. It would be understood by those skilled in the art that this embodiment is illustratively only and therefore there are various variations to each of the components of the embodiment and the combinations of processing processes, these variations being within the scope of the present invention.

REFERENCE SIGNS LIST

1 . . . Information processing system, 3 . . . Network, 4 . . . Relay apparatus, 10 . . . Storage apparatus, 20 . . . Client apparatus, 30 . . . Registration processing block, 32 . . . Information provision block, 34 . . . Icon information hold block, 36 . . . Recording processing block, 38 . . . Content distribution block, 50 . . . Storage block, 58 . . . Information processing apparatus, 60 . . . Search processing block, 62 . . . Information acquisition block, 64 . . . Display processing block

INDUSTRIAL APPLICABILITY

The present invention is for use in an information processing system in which a server and a client are interconnected through a network.

The invention claimed is:
1. An information processing system comprising:
one or more processors and a memory coupled to the one or more processors;
a media server; and
at least two client information processing apparatuses connectable with the media server through a network;
the media server having:
a registration processing block configured to register the client information processing apparatuses with the media server, such that the at least two client information processing apparatuses are associated with one another as being part of a single client apparatus, and such that the media server receives respective client information from the client information processing apparatuses, the client information including, for each of the client information processing apparatuses: (i)

device identification information including a unique identifier of the given client information processing apparatus that permits a user to differentiate the at least two client information processing apparatuses from one another, and (ii) type identification information including an indication of an overall function of the given client information processing apparatus, and an information provision block configured to provide the client information associated with the registered client information processing apparatuses that are associated with one another to at least one of the client information processing apparatuses;

each of the client information processing apparatuses having:

an information acquisition block configured to acquire the client information from the media server, display processing block configured to generate display data for displaying the acquired client information, and a display operating to display the display data such that the type identification information and the device identification information for each of the client information processing apparatuses are displayed on the display in a way that conveys to a viewer that the client information processing apparatuses are associated with one another, wherein:

the display processing block is configured to generate the display data to include a respective type icon image for each of the client information processing apparatuses, where each type icon image provides graphical indicia of the type identification information including the indication of the overall function of the given client information processing apparatus; and the display data is displayed on the display such that the respective type icon image is located adjacent to the respective type identification information and the respective device identification information for each of the client information processing apparatuses.

2. The information processing system according to claim 1, wherein, if the information acquisition block acquires information associated with a plurality of client apparatuses, the display processing block generates display data for displaying type identification information and device identification information for each client apparatus.

3. The information processing system according to claim 1, wherein type identification information is a name of the client apparatus.

4. The information processing system according to claim 1, wherein device identification information is at least one of a MAC address, a preset nickname, and most recent access date and time of the client apparatus.

5. The information processing system according to claim 1, wherein the media server further has a hold block configured to hold type identification information of the client apparatus and icon information of that client apparatus by relating these pieces of information with each other, the registration processing block acquires type identification information and device identification information from the client apparatus and registers these pieces of information, the information provision block provides icon information associated with type identification information to the client information processing apparatus, the information acquisition block acquires icon information as client information, and the display processing block generates display data for displaying an icon image.

6. The information processing system according to claim 1, wherein, if the client information processing apparatus is the client apparatus, then the display processing block generates display data for displaying client information of the client information processing apparatus concerned in a manner different from that of another client apparatus.

7. A system, comprising:

one or more processors and a memory coupled to the one or more processors;

at least two client information processing apparatuses for displaying information related with a single client apparatus registered in a media server, the media server having: (a) a registration processing block configured to register the client information processing apparatuses with the media server, such that the at least two client information processing apparatuses are associated with one another as being part of the single client apparatus, and such that the media server receives respective client information from the client information processing apparatuses, the client information including, for each of the client information processing apparatuses: (i) device identification information including a unique identifier of the given client information processing apparatus that permits a user to differentiate the at least two client information processing apparatuses from one another, and (ii) type identification information including an indication of an overall function of the given client information processing apparatus, and (b) an information provision block configured to provide the client information associated with the registered client information processing apparatuses that are associated with one another to at least one of the client information processing apparatuses, each of the client information processing apparatuses comprising:

an information acquisition block configured to acquire the client information from the media server; and display processing block configured to generate display data for displaying the acquired client information, and a display operating to display the display data such that the type identification information and the device identification information for each of the client information processing apparatuses are displayed on the display in a way that conveys to a viewer that the client information processing apparatuses are associated with one another, wherein:

the display processing block is configured to generate the display data to include a respective type icon image for each of the client information processing apparatuses, where each type icon image provides graphical indicia of the type identification information including the indication of the overall function of the given client information processing apparatus; and the display data is displayed on the display such that the respective type icon image is located adjacent to the respective type identification information and the respective device identification information for each of the client information processing apparatuses.

8. A server for providing display data to at least two client information processing apparatuses, the server comprising:

one or more processors and a memory coupled to the one or more processors;

a registration processing block configured to register the client information processing apparatuses with the media server, such that the at least two client information processing apparatuses are associated with one another as being part of a single client apparatus, and such that the media server receives respective client information from the client information processing apparatuses, the client information including, for each of the client information processing apparatuses: (i) device identification information including a unique identifier of the given client information processing apparatus that permits a user to differentiate the at least two client information processing apparatuses from one another, and (ii) type identification information including an indication of an overall function of the given client information processing apparatus, and an information provision block configured to provide the client information associated with the registered client information processing apparatuses that are associated with one another to at least one of the client information processing apparatuses, wherein each of the client information processing apparatuses includes: (i) an information acquisition block configured to acquire the client information from the media server, (ii) a display processing block configured to generate display data, and (iii) a display operating to display the acquired client information such that the type identification information and the device identification information for each of the client information processing apparatuses are displayed in a way that conveys to a viewer that the client information processing apparatuses are associated with one another, wherein:

the display processing block is configured to generate the display data to include a respective type icon image for each of the client information processing apparatuses, where each type icon image provides graphical indicia of the type identification information including the indication of the overall function of the given client information processing apparatus; and the display data is displayed on the display such that the respective type icon image is located adjacent to the respective type identification information and the respective device identification information for each of the client information processing apparatuses.

9. A non-transitory computer readable storage medium containing a computer program, which when executed causes one or more computers to implement at least two client information processing apparatuses for displaying information related with a single client apparatus registered in a media server, comprising:

a registration processing block configured to register the client information processing apparatuses with the media server, such that the at least two client information processing apparatuses are associated with one another as being part of the single client apparatus, and such that the media server receives respective client information from the client information processing apparatuses, the client information including, for each of the information processing apparatuses: (i) device identification information including a unique identifier of the given client information processing apparatus that permits a user to differentiate the at least two client information processing apparatuses from one another, and (ii) type identification information including an indication of an overall function of the given client information processing apparatus, and an information provision block configured to provide the client information associated with the registered client information processing apparatuses that are associated with one another to at least one of the client information processing apparatuses, each of the information processing apparatuses, wherein:

an information acquisition block configured to acquire the client information from the media server;

display processing block configured to generate display data for displaying the acquired client information; and a display operating to display the display data such that the type identification information and the device identification information for each of the client information processing apparatuses are displayed on the display in a way that conveys to a viewer that the client information processing apparatuses are associated with one another, wherein:

the display processing block is configured to generate the display data to include a respective type icon image for each of the client information processing apparatuses, where each type icon image provides graphical indicia of the type identification information including the indication of the overall function of the given client information processing apparatus; and the display data is displayed on the display such that the respective type icon image is located adjacent to the respective type identification information and the respective device identification information for each of the client information processing apparatuses.

10. A non-transitory, computer readable storage medium containing a computer program, which when executed causes a computer to implement a server for providing display data to at least two client information processing apparatuses, including:

a registration processing block configured to register the client information processing apparatuses with the media server, such that the at least two client information processing apparatuses are associated with one another as being part of a single client apparatus, and such that the media server receives respective client information from the client information processing apparatuses, the client information including, for each of the client information processing apparatuses: (i) device identification information including a unique identifier of the given client information processing apparatus that permits a user to differentiate the at least two client information processing apparatuses from one another, and (ii) type identification information including an indication of an overall function of the given client information processing apparatus, and an information provision block configured to provide the client information associated with the registered client information processing apparatuses that are associated with one another to at least one of the client information processing apparatuses, wherein:

each of the client information processing apparatuses includes: (i) an information acquisition block configured to acquire the client information from the media server, (ii) a display processing block configured to generate display data, and (iii) a display operating to display the acquired client information such that the type identification information and the device identification information for each of the client information processing apparatuses are displayed in a way that conveys to a viewer that the client information processing apparatuses are associated with one another, the display processing block is configured to generate the display data to include a respective type icon image for each of the client information processing apparatuses, where each type icon image provides graphical indicia of the type identification information including the indication of the overall function of the given client information processing apparatus; and the display data is displayed on the display such that the respective type icon image is located adjacent to the respective type identification information and the respective device identification information for each of the client information processing apparatuses.

\* \* \* \* \*